UNITED STATES PATENT OFFICE 2,659,724

SULFIDES OF THIODIARYLAMINES

Richard O. Zerbe, Nitro, W. Va., assignor to Monsanto Chemical Company, St. Louis, Mo., a corporation of Delaware No Drawing. Application August 2, 1951, Serial No. 240,061

8 Claims. (Cl. 260—243)

This invention relates to new and useful compositions of matter. More particularly it relates to sulfides of thiodiarylamines.

In accordance with this invention it has been found that the sulfides of thiodiarylamines of the general formula

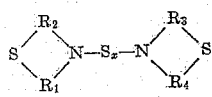

where $x$ is a whole number from 1 to 4 and where $R_1$, $R_2$, $R_3$ and $R_4$ are ortho-arylene radicals, are a new class of highly useful compounds.

The new compounds of this invention are readily prepared by reacting a thiodiarylamine with either sulfur or a sulfur halide. Among the thiodiarylamines employed in the manufacture of the new compounds are thiodiphenylamine (sometimes called phenthiazine), thiophenyl-beta-naphthylamine, thiophenyl-alpha-naphthylamine, thiodi-alpha-naphthylamine, thiodi-beta-naphthylamine, the thioditolylamines, thiodixylylamines, and the like.

The following is illustrative of the preparation of the new compounds:

Example

To a suitable reaction vessel containing 50 parts by weight (substantially 0.25 mole) of thiodiphenylamine (M. P. 180° C.) dissolved in approximately 983 parts by weight of ethylene dichloride is added with agitation while maintaining the temperature at 5 to 8° C. a solution containing 17 parts by weight (substantially 0.125 mole) of sulfur monochloride dissolved in 63 parts by weight of ethylene dichloride. Upon completion of the sulfur monochloride addition the reaction mix is agitated for a short period of time. Thereupon 40 parts by weight of sodium hydroxide in the form of a 25% aqueous solution is added with agitation. Upon completion of the caustic addition the reaction mix is agitated for a short period and the precipitate filtered off. Upon drying there is obtained 29 parts by weight of a dark green solid melting at 130–140° C. with decomposition believed to be the disulfide of thiodiphenylamine,

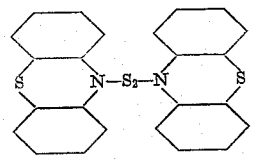

Similarly the disulfides of thiophenyl-alpha-naphthylamine, thiophenyl - beta - naphthylamine, thiodi-beta-naphthylamine and thiodi-alpha-naphthylamine are obtained employing substantially the same reaction conditions but replacing thiodiphenylamine with an equimolar amount of the respective thiodiarylamines.

Replacing sulfur monochloride in the above example with an equimolar proportion of sulfur dichloride and employing substantially the same reaction conditions the monosulfide of thiodiphenylamine,

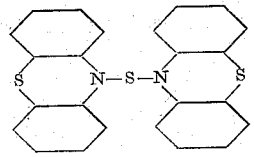

is obtained. The monosulfides of the aforementioned thiodiarylamines are prepared in a similar fashion by employing the proper thiodiarylamine.

Instead of sulfur dichloride and sulfur monochloride to produce the respective mono- and disulfides, sulfur dibromide and sulfur monobromide, respectively, may be employed. The trisulfides and the tetrasulfides may be prepared by reacting a disulfide of a thiodiarylamine with the appropriate amount of elemental sulfur.

The compositions of this invention are useful as fast curing vulcanization agents and as illustrative thereof the following rubber stock is compounded in the usual manner:

| | Parts by weight |
|---|---|
| Smoked sheets rubber | 100 |
| Philblack O | 50 |
| Zinc oxide | 5 |
| Stearic acid | 2 |
| Saturated hydrocarbon oil softener | 3 |
| p-Amino biphenyl-acetone condensation product | 1.5 |
| N-cyclohexyl benzothiazole sulfenamide | 0.8 |
| Product of Example | 7.2 |

The above stock so compounded is vulcanized in the usual manner by heating in a press at 144° C. for various periods of time. The physical properties are set forth below:

TABLE

| Minutes' cure | Modulus of Elasticity in lbs./in.² at Elongations of— | | Ultimate Tensile, lbs./in.² | Ultimate Elongation, percent |
|---|---|---|---|---|
| | 300% | 500% | | |
| 30 | 725 | 1,505 | 1,505 | 500 |
| 60 | 890 | 1,880 | 1,880 | 500 |

Similar fast curing results are obtained employing the disulfides of thiophenyl-alpha-naphthylamine, thiophenyl - beta - naphthylamine, thiodi-alpha-naphthylamine, and thiodi-beta-naphthylamine, respectively, as vulcanization agents.

What is claimed is:

1. As a new composition of matter a compound of the formula

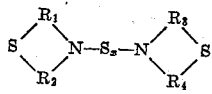

where $x$ is an integer from 1 to 4 and where $R_1$, $R_2$, $R_3$ and $R_4$ are ortho-arylene hydrocarbon radicals of the benzene and naphthalene series containing less than eleven carbon atoms.

2. As a new composition of matter a compound of the formula

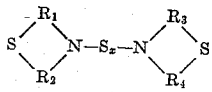

where $x$ is an integer from 1 to 4 and where $R_1$, $R_2$, $R_3$ and $R_4$ are like ortho-phenylene hydrocarbon radicals containing less than nine carbon atoms.

3. As a new composition of matter a compound of the formula

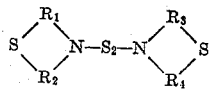

where $R_1$, $R_2$, $R_3$ and $R_4$ are ortho-arylene unsubstituted hydrocarbon radicals of the benzene and naphthalene series.

4. As a new composition of matter a compound of the formula

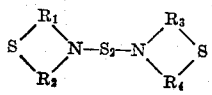

where $R_1$, $R_2$, $R_3$ and $R_4$ are like ortho-phenylene hydrocarbon radicals containing less than nine carbon atoms.

5. As a new composition of matter the disulfide of thiodiphenylamine of the structure

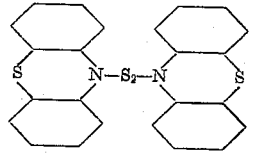

6. The process of making the composition of claim 1 which comprises condensing with cooling in an organic solvent inert to the reactants a sulfur halide with a thiodiarylamine, wherein the aryl substituents are ortho-arylene hydrocarbon radicals of the benzene and naphthalene series containing less than eleven carbon atoms.

7. The method of making the composition of claim 3 which comprises condensing with cooling in an organic solvent inert to the reactants a sulfur monohalide with a thiodiarylamine, wherein the aryl radicals of the thiodiarylamine are ortho-arylene unsubstituted hydrocarbon radicals of the benzene and naphthalene series.

8. The method of making the composition of claim 5 which comprises condensing with cooling in an organic solvent inert to the reactants substantially equimolar proportions of sulfur monochloride and thiodiphenylamine.

RICHARD O. ZERBE.

References Cited in the file of this patent

UNITED STATES PATENTS

| Number | Name | Date |
|---|---|---|
| 1,719,920 | Bedford | July 9, 1929 |
| 2,035,620 | Semon | Mar. 31, 1936 |

OTHER REFERENCES

Hunter: Chem. Abstracts, vol. 18, p. 984 (1924).